(12) United States Patent
Bower, III et al.

(10) Patent No.: US 10,901,930 B1
(45) Date of Patent: Jan. 26, 2021

(54) SHARED VIRTUAL MEDIA IN A COMPOSED SYSTEM

(71) Applicant: LENOVO ENTERPRISE SOLUTIONS (SINGAPORE) PTE. LTD., Singapore (SG)

(72) Inventors: Fred A. Bower, III, Durham, NC (US); Caihong Zhang, Shanghai (CN); Patrick L. Caporale, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/658,766

(22) Filed: Oct. 21, 2019

(51) Int. Cl.
| | | |
|---|---|---|
| *G06F 13/40* | (2006.01) | |
| *H04L 29/08* | (2006.01) | |
| *G06F 13/16* | (2006.01) | |
| *G06F 9/455* | (2018.01) | |
| *G06F 13/42* | (2006.01) | |
| *G06F 3/06* | (2006.01) | |
| *G06F 12/0868* | (2016.01) | |

(52) U.S. Cl.
CPC ........ *G06F 13/4022* (2013.01); *G06F 3/0664* (2013.01); *G06F 9/45558* (2013.01); *G06F 12/0868* (2013.01); *G06F 13/16* (2013.01); *G06F 13/4027* (2013.01); *G06F 13/4282* (2013.01); *H04L 67/2842* (2013.01); *G06F 2009/45583* (2013.01); *G06F 2213/0026* (2013.01); *H04L 67/10* (2013.01)

(58) Field of Classification Search
CPC .... G06F 3/0662; G06F 3/0664; G06F 3/0665; G06F 2003/0691; G06F 2003/0694; G06F 9/45558; G06F 2009/45579; G06F 2009/45583; G06F 9/5077; G06F 12/0862; G06F 12/0866; G06F 12/0868; G06F 12/0873; G06F 13/16; G06F 13/1652; G06F 13/1663; G06F 13/1668; G06F 13/1673; G06F 13/4022; G06F 13/4027; G06F 13/404; G06F 13/4204; G06F 13/4221; G06F 13/4234; G06F 13/4865; G06F 13/4282; G06F 2213/0026; H04L 67/10; H04L 67/2842
See application file for complete search history.

(56) References Cited

U.S. PATENT DOCUMENTS

| | | | |
|---|---|---|---|
| 2004/0151174 A1* | 8/2004 | Del Signore | H04L 12/433 370/389 |
| 2008/0034167 A1* | 2/2008 | Sharma | G06F 3/0622 711/152 |
| 2011/0107052 A1* | 5/2011 | Narayanasamy | G06F 3/064 711/171 |
| 2012/0102491 A1* | 4/2012 | Maharana | G06F 9/4401 718/1 |
| 2013/0042066 A1* | 2/2013 | Price | G06F 12/0868 711/119 |
| 2014/0019667 A1* | 1/2014 | Shimada | G06F 11/1464 710/316 |
| 2015/0095555 A1* | 4/2015 | Asnaashari | G06F 3/0665 711/103 |

(Continued)

*Primary Examiner* — Thomas J. Cleary

(57) ABSTRACT

Shared virtual media in a composed system, including generating, in a switch of a fabric of the composed system, a virtual media device; associating media data with the virtual media device; and sending, by the switch, via the fabric, to one or more compute nodes of the composed system, the media data.

20 Claims, 7 Drawing Sheets

(56) References Cited

U.S. PATENT DOCUMENTS

2018/0285019 A1* 10/2018 Olarig .................. H04L 49/357
2019/0179571 A1*  6/2019 Hayashi ................ G06F 3/0659
2019/0227744 A1*  7/2019 Olarig .................. G06F 12/123
2019/0310957 A1* 10/2019 Olarig ................. G06F 13/4282
2020/0050470 A1*  2/2020 Guo ..................... G06F 3/0679

* cited by examiner

SHARED VIRTUAL MEDIA IN A COMPOSED SYSTEM

BACKGROUND

Field of the Invention

The field of the invention is data processing, or, more specifically, methods, apparatus, and products for shared virtual media in a composed system.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Shared virtual media in a composed system, including: generating, in a switch of a fabric of the composed system, a virtual media device; associating media data with the virtual media device; and sending, by the switch, via the fabric, to one or more compute nodes of the composed system, the media data.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
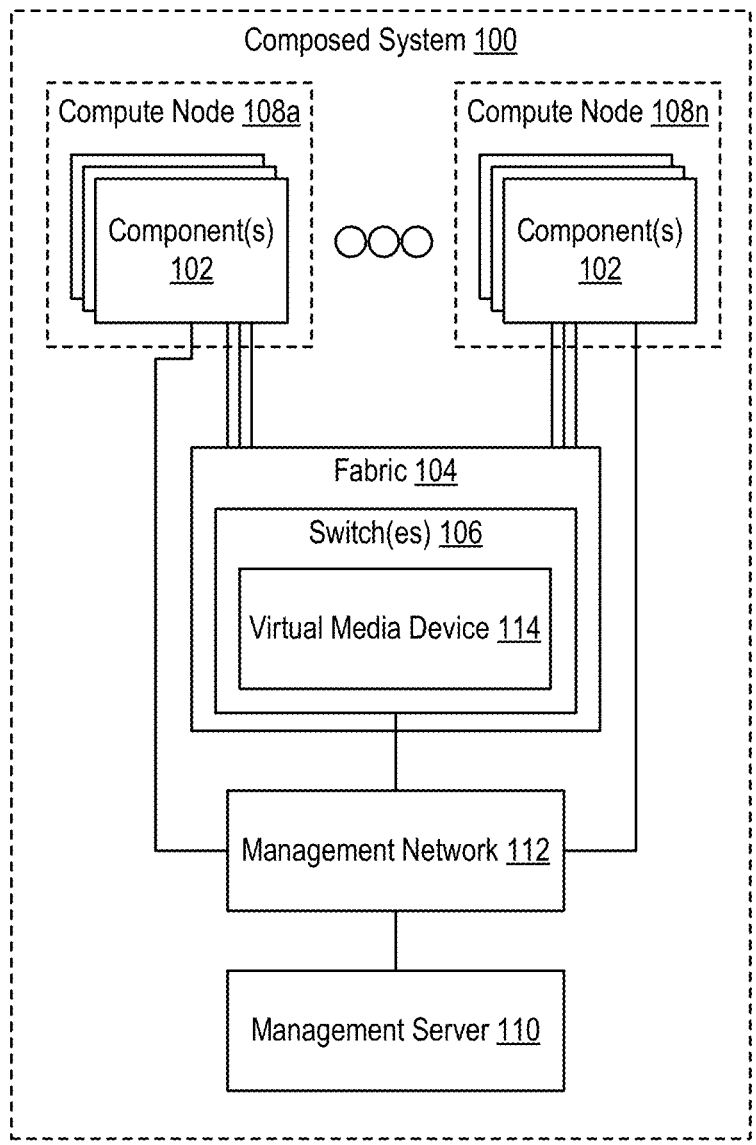
FIG. 1 is a block diagram of a composed system configured for shared virtual media in a composed system according to some embodiments of the present disclosure.

Exemplary methods, apparatus, and products for shared virtual media in a composed system in accordance with the present invention are described with reference to the accompanying drawings, beginning with FIG. 1. FIG. 1 sets forth a block diagram of a composed system configured for shared virtual media in a composed system according to embodiments of the present invention. The system of FIG. 1 includes a composed system 100 that includes a plurality of components 102. Each of the components 102 comprises a hardware component or device usable in computing devices. For example, the components 102 may include memory components (e.g., Random Access Memory, disk storage, solid state storage), processing components (e.g., central processing units (CPUs)), network controllers (e.g., Ethernet controllers, wireless networking controllers, etc.), hardware accelerators (e.g., Graphics Processing Units (GPUs), Artificial Intelligence (AI) accelerators), and other hardware components as can be appreciated.

Each of the components 102 are coupled to a fabric 104. The fabric 104 comprises a communications topology through which the components 102 may be interconnected via a plurality of switches 106. The fabric 104 may implement a mesh connection connecting the components 102 as endpoints, with the switches 106 serving as intermediary nodes. The fabric 104 may use high-speed interconnects to connect components 102, such as Peripheral Component Interconnect Express (PCIe), Infiniband, or another high-speed interconnect. For example, the fabric 104 may comprise a PCIe fabric 104, and the switches 106 may comprise PCIe switches 106.

The composed system 100 also includes one or more compute nodes 108*a-n*. Compute nodes 108*a-n* are logical constructs comprising a plurality of components 102. Each compute node 108*a-n* is allocated sufficient components 102 to function as a computing device (e.g., memory, CPU, network controllers, etc.). Instead of these allocations of components 102 each being housed in a dedicated enclosure (e.g., a server enclosure per allocation of components 102), the components 102 of a given compute node 108*a-n* are logically associated via the fabric 104. Thus, compute nodes 108*a-n* may be dynamically provisioned, deprovisioned, reconfigured, etc. via the fabric 104.

The composed system 100 also includes a management server 110. The management server 110 may be configured to provision, deprovision, and/or configure compute nodes 108*a-n* by associating components 102 via the fabric 104. The management server 110 may also monitor the operation of components 102 and/or compute nodes 108*a-n*. The management server 110 may communicate with compute nodes 108*a-n* and switches 106 via a management network 112. The management network 112 may comprise a network separate from the network established by the fabric 104. For example, the management network 112 may comprise an Ethernet network. Accordingly, the management server 110 may connect to the switches 106 via an Ethernet connection on the switch 106. The management server 110 may also communicate with compute nodes 108*a-n* through one or more components of the compute node 108*a-n* (e.g., a network controller, a baseboard management controller, etc.) via the management network 112.

Media data may need to be made accessible to compute nodes 108*a-n*. For example, a compute node 108*a-n* may need to access an operating system or hypervisor image in order to complete instantiation of the compute node 108*a-n*. In existing approaches, a virtual media device 114 (e.g., a virtual drive) may be generated on a baseboard management controller (BMC) of a given compute node 108a-n via the management network 112. The compute node 108a-n may then access the media data of the virtual media device 114 of the BMC. Where multiple compute nodes 108a-n need to access the media data, multiple virtual drives must be generated on multiple BMCs via the management network 112. This places a substantial network burden on the management network 112, which may use a lower-speed interconnect relative to the fabric 104, as well as the BMCs.

Instead, a virtual media device 114 may be generated in a switch 106 of the fabric 104 of the composed system 100. The virtual media device 114 may be generated in response to a request from the management server 110 to generate the virtual media device 114. The switch 106 may then associate media data with the virtual media device 114. The media data may comprise a disk image, a file system, or other data to be made accessible to compute nodes 108a-n via the virtual media device 114. The media data may be received from the management server 110 (e.g., via the management network 112, via an Ethernet connection, etc.). For example, the media data may be received from the management server 110 in response to the switch 106 acknowledging a request from the management server 110 (e.g., a request to generate the virtual media device 114). As another example, the media data may be encapsulated or otherwise included in a request to generate the virtual media device 114. As a further example, the media data may be sent to the switch 106 after a command to the switch 106 indicating that the media data will be sent. Associating the media data with the virtual media device 114 may comprise mounting a disk image or file system of the media data via the virtual media device 114.

For example, assume the switch 106 comprises a PCIe switch 106 of a PCIe fabric 104. Associating the media data with the virtual device 114 may comprise associating each port of a plurality of ports of the PCIe switch 106 with a corresponding PCIe virtual function. Each PCIe virtual function may facilitate access to the virtual media device 114 by a corresponding compute node 108a-n Thus, each compute node 108a-n sees the virtual media device 114 as a mounted device via its corresponding virtual function.

The switch 106 may then send, via the fabric 104, to one or more compute nodes 108a-n of the composed system 100, the media data. Each compute node 108a-n may access the media data from the switch 106 via the high-speed interconnects of the fabric 104, allowing for faster data transfers and reduced network burden when compared to approaches using a management network 112. In other words, the media data may be sent to the compute nodes 108a-n independent of the management network 112.

Sending, to the one or more compute nodes 108a-n of the composed system 100, the media data may comprise sending the media data to the one or more compute nodes 108a-n substantially in parallel. For example, assume that a plurality of compute nodes 108a-n are to be instantiated, each requiring a respective operating system. A disk image of the operating system may be accessible via the virtual media device 114 of the switch 106. Each of the compute nodes 108a-n may access the disk image of the operating system for installation in parallel, providing a speed benefit in instantiating the compute nodes 108a-n.

The switch 106 may maintain a cache comprising the media data. For example, where the media data is frequently accessed, the media data may be stored in the cache. As an example, after receiving the media data from the management server 110, the switch 106 may store the media data in the cache until the cache is flushed or the media data is replaced by other data. The media data may be stored in the cache independent of whether or not a virtual media device 114 is currently implemented in the switch 106. Accordingly, the media data may be loaded from the cache. For example, in response to a request from the management server 110, the virtual media device 114 may be generated and the media data loaded from the cache of the switch 106. The media data may then be associated with the generated virtual media device 114. Where the media data is not stored in the cache, the switch 106 may request the media data from the management server 110.

The switch 106 may maintain local storage (e.g., disk storage). As an example, after receiving the media data from the management server 110, the switch 106 may store the media data in the local storage of the switch 106. The media data may be loaded from the local storage for association with a virtual media device 114. For example, in response to a request from the management server 110, the virtual media device 114 may be generated and the media data loaded from the local storage of the switch 106. The media data may then be associated with the generated virtual media device 114. Where the media data is not stored in the local storage, the switch 106 may request the media data from the management server 110.

The arrangement of devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Although the approaches for shared virtual media in a composed system set forth above are discussed in the context of functionality performed by a switch 106, readers will appreciate that this is exemplary and that one or more functions described as being performed by the switch 106 may be performed by another entity coupled to the compute nodes 108a-n via the fabric 104 (e.g., a management server 110). For example, the virtual media device 114 may be generated in the management server 110. The media data may then be sent via the fabric 104 (e.g., via the switch 106) to the compute nodes 108a-n. Thus, media data is sent to the compute nodes 108a-n using the high-speed interconnects provided by the fabric 104.

Shared virtual media in a composed system in accordance with the present invention is generally implemented with computers, that is, with automated computing machinery. For further explanation, therefore, FIG. 2 sets forth a block diagram of automated computing machinery comprising an exemplary management server 110 configured for shared virtual media in a composed system according to embodiments of the present invention. The management server 110 of FIG. 2 includes at least one computer processor 202 or 'CPU' as well as random access memory 204 (RAM') which is connected through a high speed memory bus 206 and bus adapter 208 to processor 202 and to other components of the management server 110.

Figure 2:
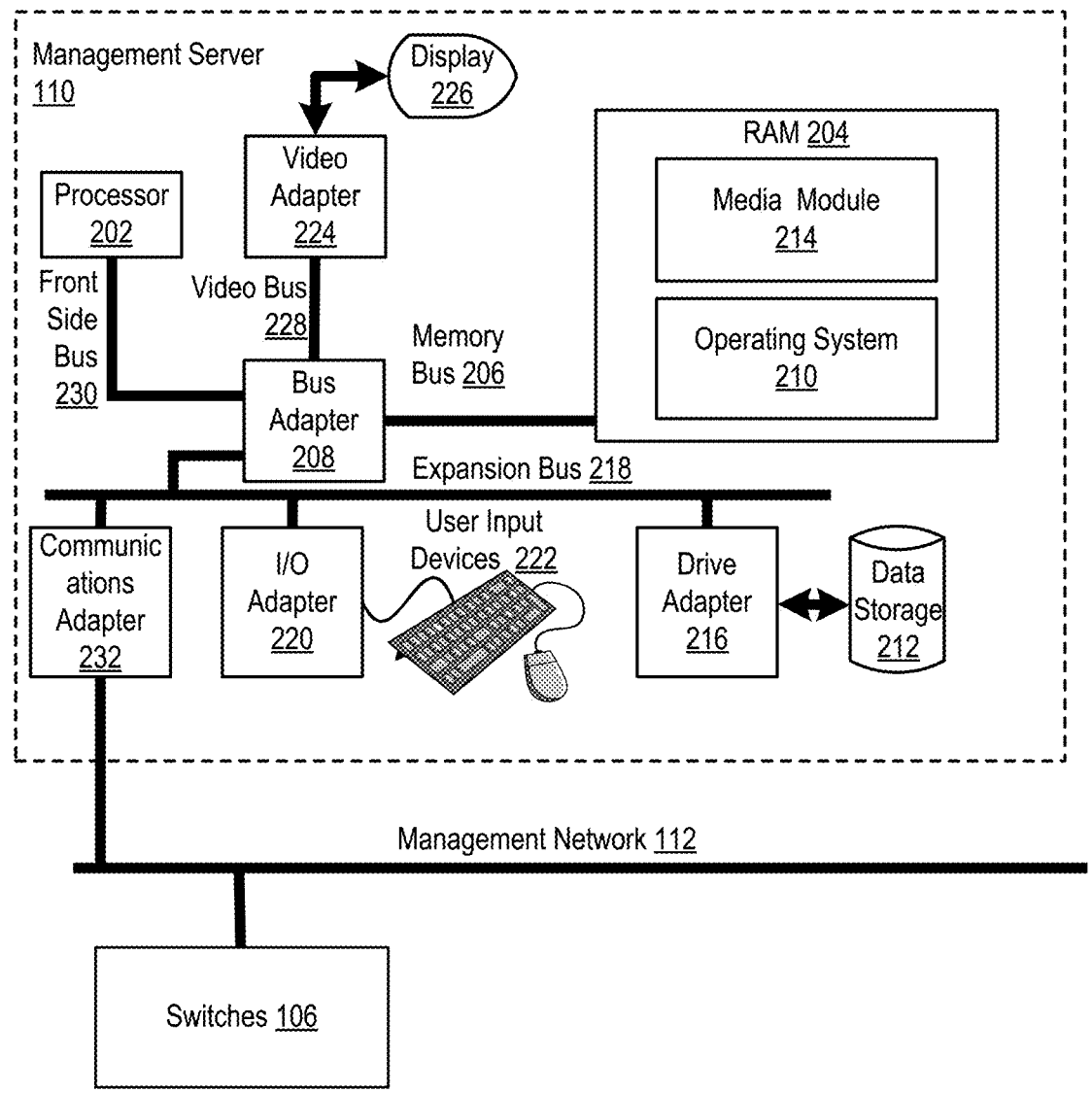
FIG. 2 is a block diagram of an example computing device for shared virtual media in a composed system according to some embodiments of the present disclosure.

Stored in RAM 204 is an operating system 210. Operating systems useful in computers configured for shared virtual media in a composed system according to embodiments of the present invention include UNIX™, Linux™, Microsoft Windows™, AIX™, IBM's i OS™, and others as will occur to those of skill in the art. The operating system 208 in the example of FIG. 2 is shown in RAM 204, but many components of such software typically are stored in non-volatile memory also, such as, for example, on data storage 212, such as a disk drive. Also stored in RAM is the media module 214 a module for shared virtual media in a composed system according to embodiments of the present invention.

The management server 110 of FIG. 2 includes disk drive adapter 216 coupled through expansion bus 218 and bus adapter 208 to processor 202 and other components of the management server 110. Disk drive adapter 216 connects non-volatile data storage to the management server 110 in the form of data storage 212. Disk drive adapters useful in computers configured for shared virtual media in a composed system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example management server 110 of FIG. 2 includes one or more input/output ('I/O') adapters 220. I/O adapters implement user-oriented input/output through, for example, software drivers and computer hardware for controlling output to display devices such as computer display screens, as well as user input from user input devices 222 such as keyboards and mice. The example management server 110 of FIG. 2 includes a video adapter 224, which is an example of an I/O adapter specially designed for graphic output to a display device 226 such as a display screen or computer monitor. Video adapter 224 is connected to processor 202 through a high speed video bus 228, bus adapter 208, and the front side bus 230, which is also a high speed bus.

The exemplary management server 110 of FIG. 2 includes a communications adapter 232 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for shared virtual media in a composed system according to embodiments of the present invention include modems for wired dial-up communications, Ethernet (IEEE 802.3) adapters for wired data communications, and 802.11 adapters for wireless data communications.

The communications adapter 232 is communicatively coupled to a management network 112 that also includes one or more switches 106.

Figure 3:
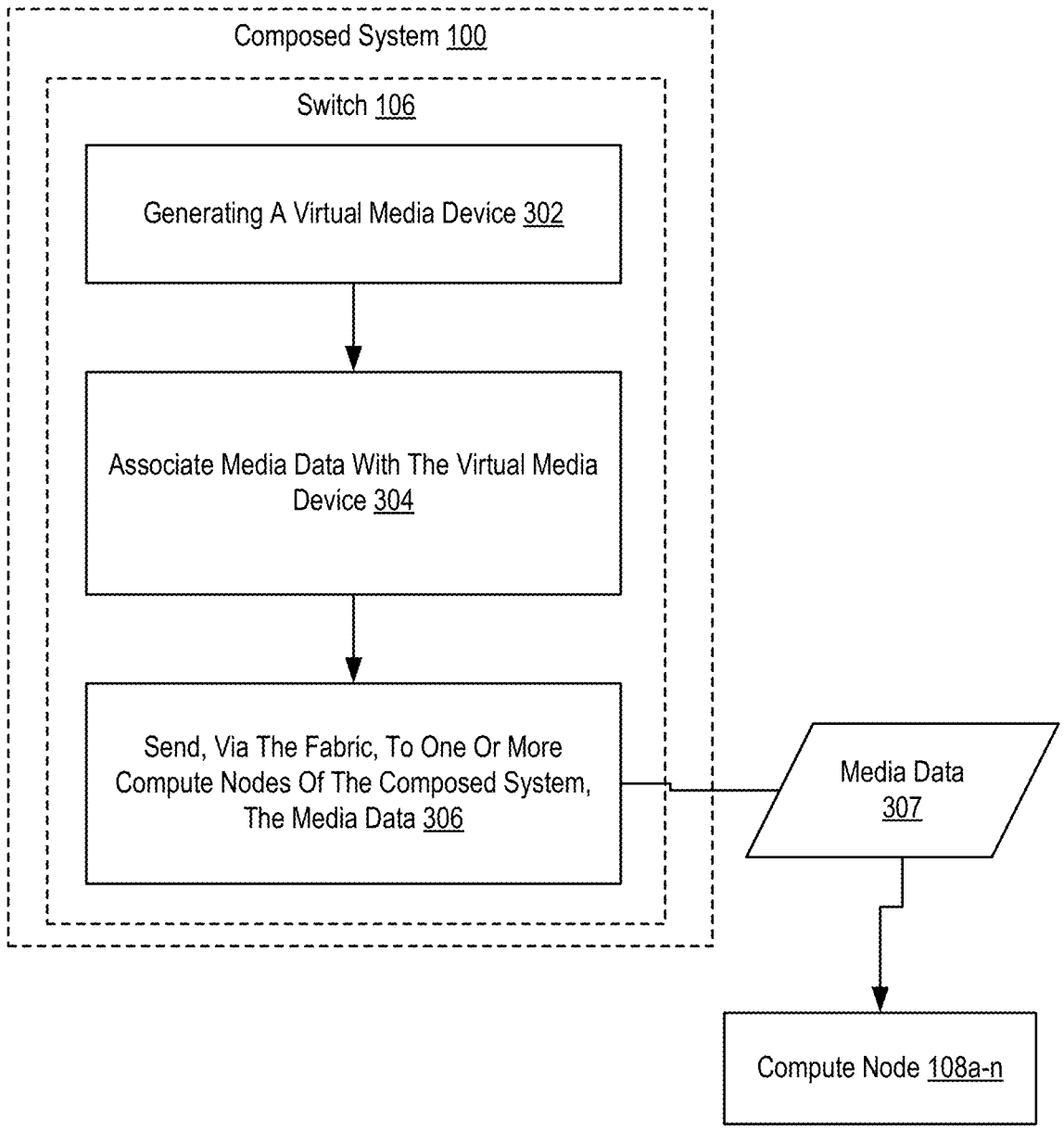
FIG. 3 is a flowchart of an example method for shared virtual media in a composed system according to some embodiments of the present disclosure.

For further explanation, FIG. 3 sets forth a flow chart illustrating an exemplary method for shared virtual media in a composed system according to embodiments of the present invention that includes generating 302, in a switch 106 of a fabric 104 of a composed system 100, a virtual media device 114. The fabric 104 comprises a communications topology through which the components 102 may be interconnected via a plurality of switches 106. The fabric 104 may implement a mesh connection connecting the components 102 as endpoints, with the switches 106 serving as intermediary nodes. The fabric 104 may use high-speed interconnects to connect components 102, such as Peripheral Component Interconnect Express (PCIe), Infiniband, or another high-speed interconnect. For example, the fabric 104 may comprise a PCIe fabric 104, and the switches 106 may comprise PCIe switches 106. The virtual media device 114 may comprise a virtual drive. The virtual media device 114 may be generated in response to a request from the management server 110 to generate the virtual media device 114.

The method of FIG. 3 also includes associating 304 (e.g., by the switch 106) media data 307 with the virtual media device 114. The media data 307 may comprise a disk image, a file system, or other data to be made accessible to compute nodes 108a-n via the virtual media device 114. Associating 304 the media data 307 with the virtual media device 114 comprises making the media data 307 available to one or more compute nodes 108a-n via the virtual media device 114. Associating 304 the media data 307 with the virtual media device 114 may comprise mounting a disk image or file system of the media data 307 via the virtual media device 114.

For example, assume the switch 106 comprises a PCIe switch 106 of a PCIe fabric 104. Associating the media data with the virtual device 114 may comprise associating each port of a plurality of ports of the PCIe switch 106 with a corresponding PCIe virtual function. Each PCIe virtual function may facilitate access to the virtual media device 114 by a corresponding compute node 108a-n. Thus, each compute node 108a-n sees the virtual media device 114 as a mounted device via its corresponding virtual function.

The method of FIG. 3 also includes sending 306 (e.g., by the switch 106), via the fabric 104, to one or more compute nodes 108a-n of the composed system 100, the media data 307. Each compute node 108a-n may access the media data 307 from the switch 106 via the high-speed interconnects of the fabric 104, allowing for faster data transfers and reduced network burden when compared to approaches using a management network 112. In other words, the media data 307 may be sent to the compute nodes 108a-n independent of the management network 112.

Figure 4:
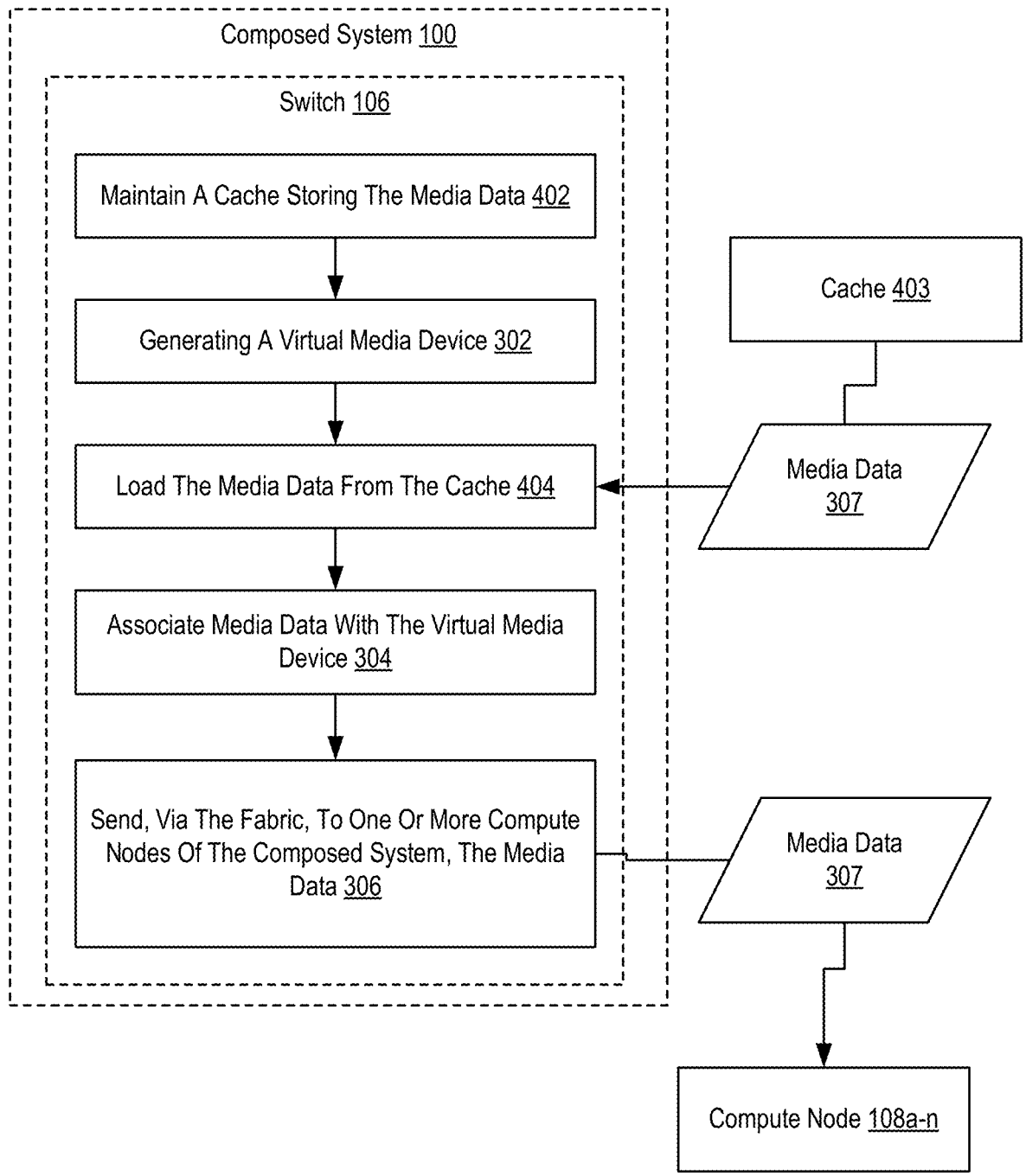
FIG. 4 is a flowchart of an example method for shared virtual media in a composed system according to some embodiments of the present disclosure.

For further explanation, FIG. 4 sets forth a flow chart illustrating an exemplary method for shared virtual media in a composed system according to embodiments of the present invention that includes generating 302, in a switch 106 of a fabric 104 of a composed system 100, a virtual media device 114; associating 304 (e.g., by the switch 106) media data 308 with the virtual media device 114; and sending 306 (e.g., by the switch 106), via the fabric 104, to one or more compute nodes 108a-n of the composed system 100, the media data 307.

The method of FIG. 4 differs from FIG. 3 in that the method of FIG. 4 further comprises maintaining 402 (e.g., by the switch 106) a cache 403 comprising the media data 307. For example, where the media data 307 is frequently accessed, the media data may be stored in 307 the cache 403. As an example, after receiving the media data 307 from the management server 110, the switch 106 may store the media data 307 in the cache 403 until the cache 403 is flushed or the media data 307 is replaced by other data. The media data 307 may be stored in the cache 403 independent of whether or not a virtual media device 114 is currently implemented in the switch 106.

The method of FIG. 4 further differs from FIG. 3 in that the method of FIG. 4 also includes loading 404 the media data 307 from the cache 403. For example, in response to a request from the management server 110, the virtual media device 114 may be generated and the media data loaded from the cache of the switch 106.

Figure 5:
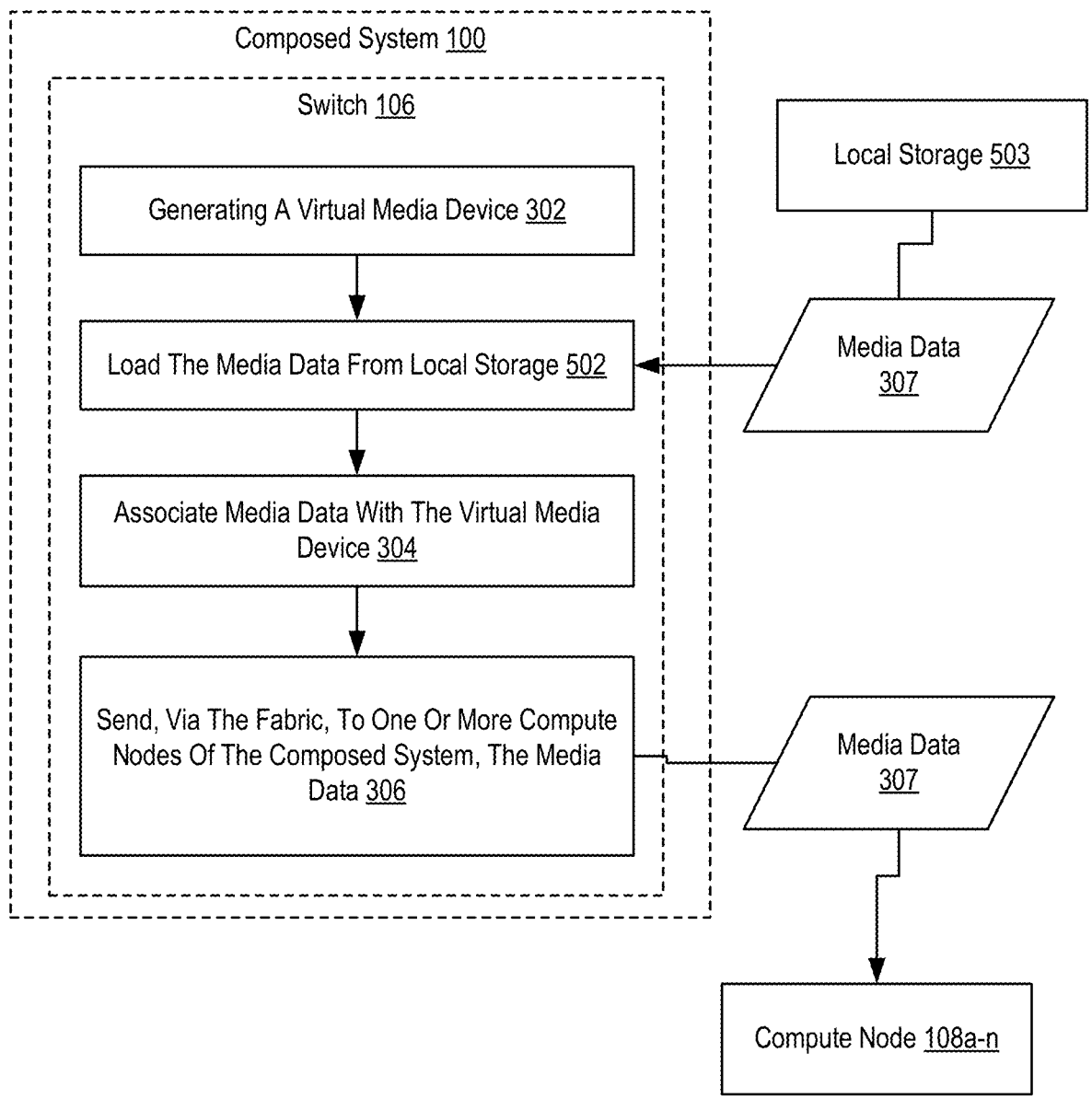
FIG. 5 is a flowchart of an example method for shared virtual media in a composed system according to some embodiments of the present disclosure.

For further explanation, FIG. 5 sets forth a flow chart illustrating an exemplary method for shared virtual media in a composed system according to embodiments of the present invention that includes generating 302, in a switch 106 of a fabric 104 of a composed system 100, a virtual media device 114; associating 304 (e.g., by the switch 106) media data 308 with the virtual media device 114; and sending 306 (e.g., by the switch 106), via the fabric 104, to one or more compute nodes 108a-n of the composed system 100, the media data 307.

The method of FIG. 5 differs from FIG. 3 in that the method of FIG. 5 further comprises loading 502 (e.g., by the switch 106) the media data 307 from local storage 503. As an example, after receiving the media data 307 from the management server 110, the switch 106 may store the media data 307 in the local storage of the switch 106. The media data may be loaded 502 from the local storage 503 for association with a virtual media device 114.

Figure 6:
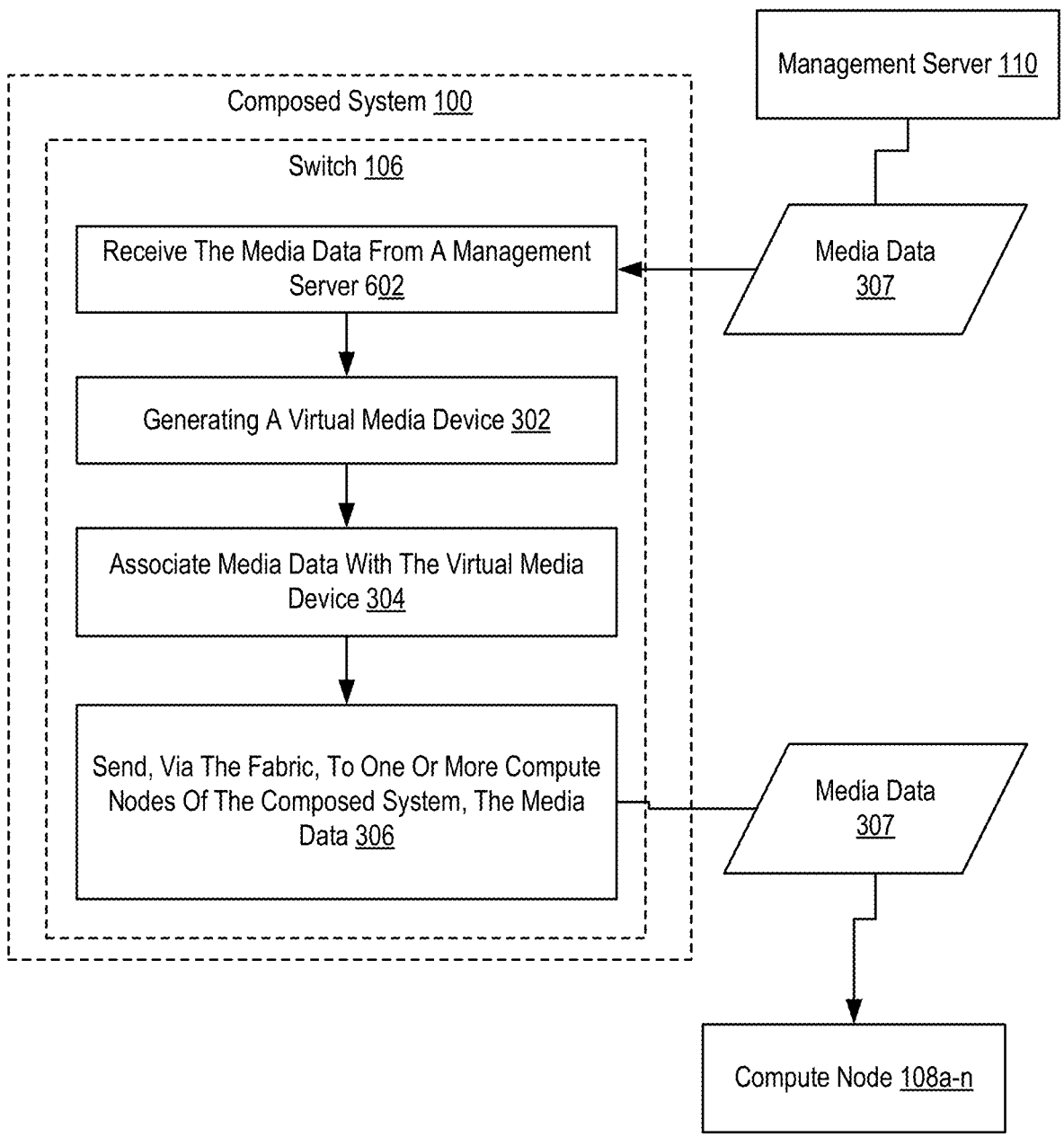
FIG. 6 is a flowchart of an example method for shared virtual media in a composed system according to some embodiments of the present disclosure.

For further explanation, FIG. 6 sets forth a flow chart illustrating an exemplary method for shared virtual media in a composed system according to embodiments of the present invention that includes generating 302, in a switch 106 of a fabric 104 of a composed system 100, a virtual media device 114; associating 304 (e.g., by the switch 106) media data 308 with the virtual media device 114; and sending 306 (e.g., by the switch 106), via the fabric 104, to one or more compute nodes 108a-n of the composed system 100, the media data 307.

The method of FIG. 6 differs from FIG. 3 in that the method of FIG. 6 further comprises receiving 602 the media data 307 from a management server 110. The media data 307 may be received 602 from the management server 110 (e.g., via the management network 112, via an Ethernet connection, etc.). For example, the media data 307 may be received 602 from the management server 110 in response to the switch 106 acknowledging a request from the management server 110 (e.g., a request to generate the virtual media device 114). As another example, the media data 307 may be encapsulated or otherwise included in a request to generate the virtual media device 114. As a further example, the media data 307 may be sent to the switch 106 after a command to the switch 106 indicating that the media data will be sent.

Figure 7:
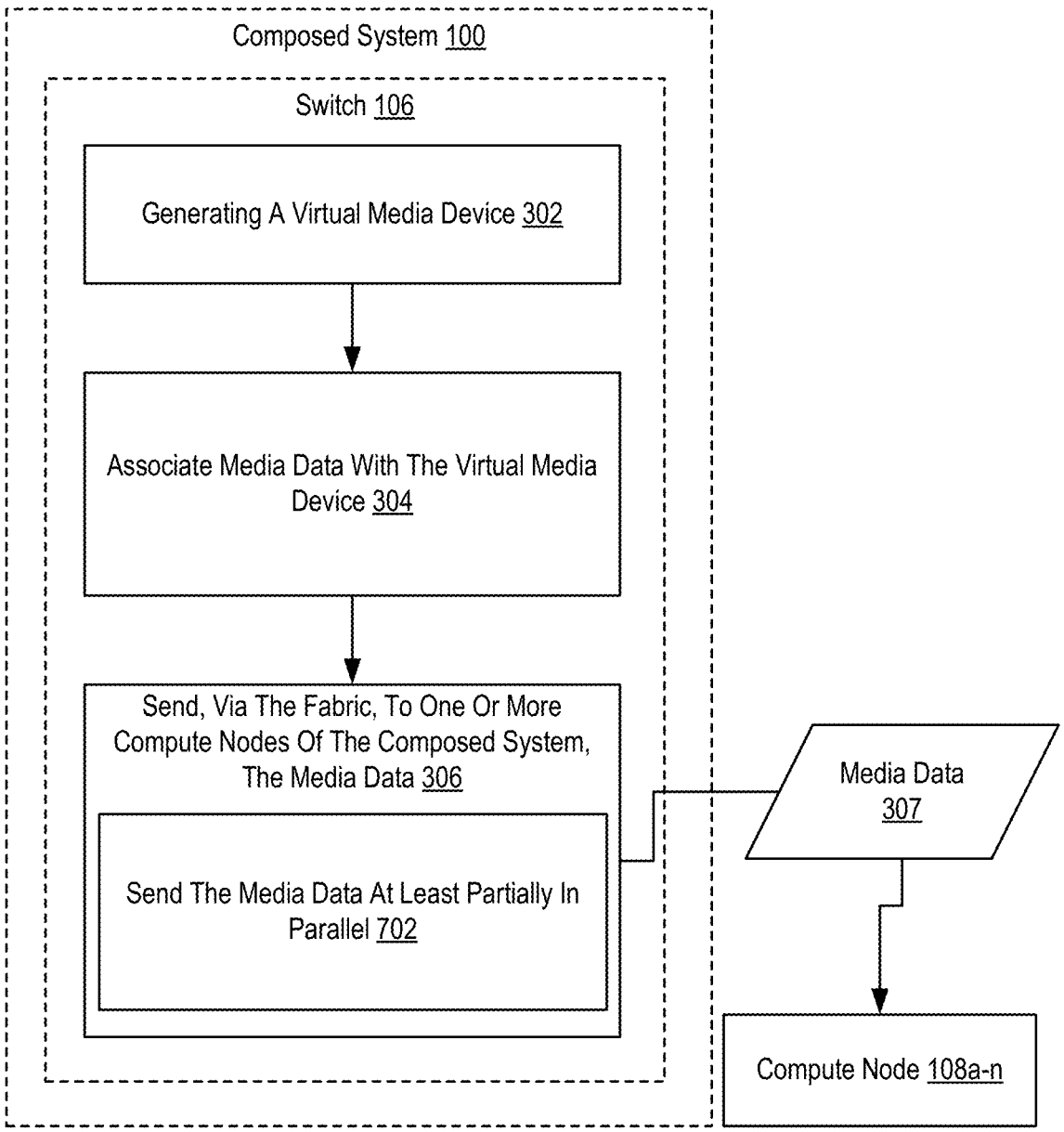
FIG. 7 is a flowchart of an example method for shared virtual media in a composed system according to some embodiments of the present disclosure.

For further explanation, FIG. 7 sets forth a flow chart illustrating an exemplary method for shared virtual media in a composed system according to embodiments of the present invention that includes generating 302, in a switch 106 of a fabric 104 of a composed system 100, a virtual media device 114; associating 304 (e.g., by the switch 106) media data 308 with the virtual media device 114; and sending 306 (e.g., by the switch 106), via the fabric 104, to one or more compute nodes 108a-n of the composed system 100, the media data 307.

The method of FIG. 7 differs from FIG. 3 in that sending 306 (e.g., by the switch 106), via the fabric 104, to one or more compute nodes 108a-n of the composed system 100, the media data 307 comprises sending 702 (e.g., by the switch 106), via the fabric 104, to one or more compute nodes 108a-n of the composed system 100, the media data 307 at least partially in parallel. For example, assume that a plurality of compute nodes 108a-n are to be instantiated, each requiring a respective operating system. A disk image of the operating system may be accessible via the virtual media device 114 of the switch 106. Each of the compute nodes 108a-n may access the disk image of the operating system for installation in parallel, providing a speed benefit in instantiating the compute nodes 108a-n.

In view of the explanations set forth above, readers will recognize that the benefits of shared virtual media in a composed system according to embodiments of the present invention include:

Improved performance of a computing system by allowing for media data transfer through a high performance fabric of a composable system, providing for speed benefits compared to using a management network.

Improved performance of a computing system by allowing for media data transfer through a fabric of a composable system, offloading the computational burden of the media data transfer from the management network.

Exemplary embodiments of the present invention are described largely in the context of a fully functional computer system for shared virtual media in a composed system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of shared virtual media in a composed system, the method comprising:
  generating, in a switch of a fabric of the composed system, a virtual media device;
  associating media data with the virtual media device, wherein the media data comprises data for completing instantiation of two or more compute nodes; and
  providing access, by the switch, via the virtual media device, to the two or more compute nodes of the composed system, the media data to complete instantiation of the two or more compute nodes.

2. The method of claim 1, wherein the fabric of the composed system comprises a Peripheral Component Interconnect Express (PCIe) fabric, and the switch comprises a PCIe switch, and wherein the media data comprises a disk image of an operating system.

3. The method of claim 1, further comprising:
  maintaining, by the switch, a cache comprising the media data; and
  loading, from the cache, the media data, wherein providing access to the media data comprises retrieving the media data from the cache and sending the retrieved media data to the two or more compute nodes of the composed system.

4. The method of claim 1, further comprising loading the media data from local storage of the switch.

5. The method of claim 1, further comprising receiving the media data from a management server.

6. The method of claim 1, wherein providing access to the media data comprises sending, to the two or more compute nodes, the media data substantially in parallel.

7. The method of claim 1, wherein providing access to the media data to the two or more compute nodes is independent of a management network of the composed system.

8. An apparatus for shared virtual media in a composed system, the apparatus comprising a computer processor, a computer memory operatively coupled to the computer processor, the computer memory having disposed within it computer program instructions that, when executed by the computer processor, cause the apparatus to perform operations comprising:
generating, in a switch of a fabric of the composed system, a virtual media device;
associating media data with the virtual media device, wherein the media data comprises data for completing instantiation of two or more compute nodes; and
providing access, by the switch, via the virtual media device, to the two or more compute nodes of the composed system, the media data to complete instantiation of the two or more compute nodes.

9. The apparatus of claim 8, wherein the fabric of the composed system comprises a Peripheral Component Interconnect Express (PCIe) fabric, and the switch comprises a PCIe switch.

10. The apparatus of claim 8, wherein the operations further comprise:
maintaining, by the switch, a cache comprising the media data; and
loading, from the cache, the media data, and
wherein providing access to the media data comprises retrieving the media data from the cache and sending the retrieved media data to the two or more compute nodes of the composed system.

11. The apparatus of claim 8, wherein the operations further comprise loading the media data from local storage of the switch.

12. The apparatus of claim 8, wherein the operations further comprise receiving the media data from a management server.

13. The apparatus of claim 8, wherein providing access to the media data comprises sending, to the two or more compute nodes, the media data substantially in parallel.

14. The apparatus of claim 8, wherein providing access to the media data to the two or more compute nodes is independent of a management network of the composed system.

15. A computer program product for shared virtual media in a composed system, comprising a non-volatile computer readable medium and computer program instructions stored therein, the computer program instructions being configured to, when executed, cause a computer to perform operations comprising:
generating, in a switch of a fabric of the composed system, a virtual media device;
associating media data with the virtual media device, wherein the media data comprises data for completing instantiation of two or more compute nodes; and
providing access, by the switch, via the virtual media device, to the two or more compute nodes of the composed system, the media data to complete instantiation of the two or more compute nodes.

16. The computer program product of claim 15, wherein the fabric of the composed system comprises a Peripheral Component Interconnect Express (PCIe) fabric, and the switch comprises a PCIe switch.

17. The computer program product of claim 15, wherein the operations further comprise:
maintaining, by the switch, a cache comprising the media data; and
loading, from the cache, the media data, and
wherein providing access to the media data comprises retrieving the media data from the cache and sending the retrieved media data to the two or more compute nodes of the composed system.

18. The computer program product of claim 15, wherein the operations further comprise loading the media data from local storage of the switch.

19. The computer program product of claim 15, wherein the operations further comprise receiving the media data from a management server.

20. The computer program product of claim 15, wherein providing access to the media data comprises sending, to the two or more compute nodes, the media data substantially in parallel.

* * * * *